United States Patent Office 3,281,302
Patented Oct. 25, 1966

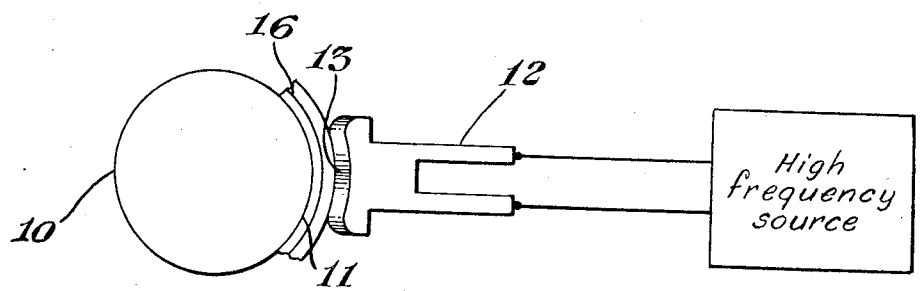
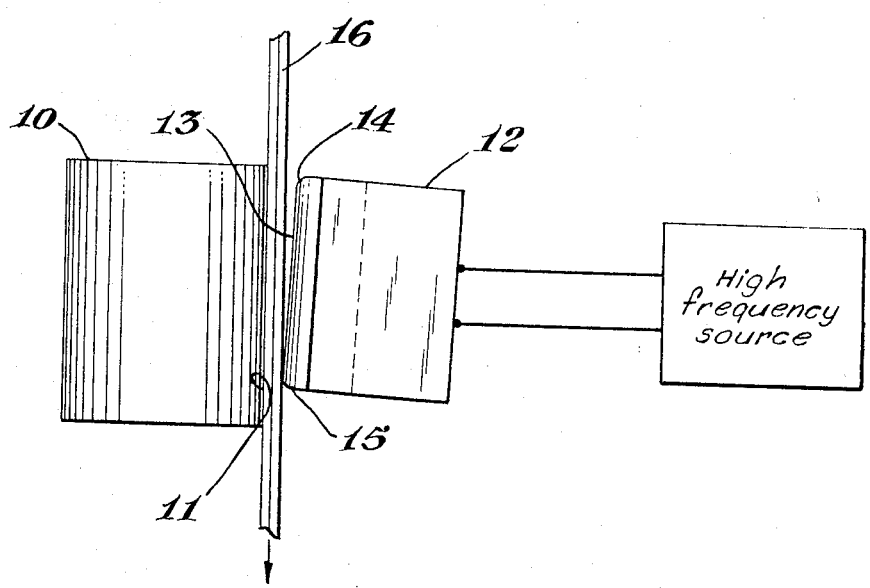

3,281,302
METHOD AND APPARATUS FOR WELDING
THERMOPLASTIC FILMS
Marvin J. Kreh, Midland, and Arthur D. Herrell, Bay City, Mich., assignors to The Dow Chemical Company, Midland, Mich., a corporation of Delaware
Filed Sept. 9, 1963, Ser. No. 307,523
10 Claims. (Cl. 156—274)

This invention relates to a method of, and an apparatus for, the high-frequency welding of thermoplastic films. It relates more particularly to a method and apparatus for providing a continuous longitudinal seam of improved strength along lapped surfaces of thermoplastic films utilizing certain composite high frequency welding electrodes.

It is common practice to form hollow articles by sealing or welding lapped edges of double or folded sheets of organic thermoplastic film material. Thus, when a sheet is folded longitudinally and the matched edges are sealed, a tube is produced. If such tube is sealed transversely at intervals along its length, a connected series of closed packages is obtained. The preparation of these and other types of sealed articles from plastic films has been accomplished using adhesives, externally applied heat, or both, or by welding operations using a radiofrequency field and high frequency welding electrodes. Prior known methods of welding thermoplastic films, however, are often incapable of forming welds which have sufficient strength for preparing tubular packaging materials used in high speed, continuous packaging of foodstuffs and the like articles.

It is among the objects of the present invention to provide a method for obtaining improved welds in organic thermoplastic film materials using certain composite high energy electrodes.

A related object is to provide a method for obtaining tubular organic thermoplastic packaging materials having a continuous longitudinal weld of improved strength, which materials are particularly suited for packaging foodstuffs and the like articles.

A related object is the provision of an apparatus wherein the foregoing objects may be attained.

Other and related objects may become apparent from the following description and claims, and the annexed drawings wherein:

FIGURE 1 is a plane view of a pair of cooperating electrodes used for carrying out the method of the invention; and FIGURE 2 is a side elevation of the same pair of cooperating electrodes.

The method of the present invention comprises superposing two or more layers of organic thermoplastic film in lapped overlying relationship and advancing such lapped surfaces longitudinally between, and in sliding contact with, a pair of cooperating electrodes comprising (1) a grounded fixed electrode having a film supporting face of generally convex shape and smooth surface and (2) an elongate, movable, mating electrode connected electrically to a high frequency source, i.e. radiofrequency, operating at an intensity known to weld such film surfaces, and wherein the mating surface of such movable electrode has a radius which is at least about 1/16 of an inch greater than the film contacting surface of the fixed electrode, whereby a substantially uniform gradient seal is formed.

Practice of the method of the present invention produces uniform, strong welds without injury to the film. Such method is particularly suited for producing such welds in organic thermoplastic film materials used for the production packaging of foodstuffs and the like articles and is especially suited for providing welds of improved strength in packages formed from normally crystalline vinylidene chloride polymer film materials.

The invention may be understood more readily by reference to the accompanying drawing wherein the FIGURE 1 represents a plan view of a pair of cooperating electrodes between which two or more layers of organic thermoplastic film in lapped overlying relationship are advanced and welded as previously defined. In the said drawing, wherein the spacing between the film contacting surfaces of the electrodes is exaggerated for clarity, is shown a grounded fixed electrode 10 having a film supporting face 11 of generally convex shape and smooth surface which cooperates with the mating surface 13 of the elongate, movable electrode 12 which electrode is connected electrically to a high frequency source (shown schematically) operating at an intensity known to weld the organic thermoplastic film material. In this regard, such high frequency source, i.e. radiofrequency, should be capable of operating at from 20 to 200, and usually from 20 to 60, megacycles per second.

FIGURE 2 represents a side elevation of the electron pair of FIGURE 1, and further illustrates a preferred embodiment of the present invention wherein 14 represents that portion of the mating face of the movable electrode 12 which is initially adjacent the lapped surfaces of organic thermoplastic film 16 which passes between the electrodes 10 and 12. In this regard, it has been found that for the obtainment of uniform gradient welds of optimum strength, it is preferred that the portion of the mating surface 14 of the movable electrode 12 is spaced apart from the said lapped surfaces 16 a distance of between about 0.001 and 0.006 of an inch per linear inch of said mating surface 13, with the opposite extremities of said mating surface generally designated as 15 being in contact with the said lapped surfaces 16. It is pointed out that the movable electrode 12 is thus preferentially tilted away from, and in converging relation with, the film supporting face 11 of the fixed electrode 10 in such a manner as to allow the desired spacing between that portion of the mating face 14 of the movable electrode adjacent the surfaces of organic thermoplastic film 16. Spacings in excess of those described herein may result in undesirable "ploughing" of the high frequency source with resultant formation of non-uniformly welded areas.

It has further been found advantageous to chamfer the mating surface 13 of the movable electrode 12 to provide smoothly beveled edges and rounded corners.

For tube forming operations, such as accomplished utilizing the packaging apparatus as described by the U.S. Patent No. 2,831,302 (issued April 22, 1958), the fixed electrode may be positioned vertically within the tube formation as a portion of a conventionally employed tube filling mandrel, while, the movable electrode is pivotally secured in cooperative adjustable relationship with the said fixed electrode to provide an essentially uniform gradient seal between overlapping edges of a continuous web of organic thermoplastic material, to form a tube which moves in the direction axially of the said mandrel.

It is pointed out that the method and apparatus of the present invention may be advantageously used in any operation requiring uniform, strong welds in lapped edges of a plurality of organic thermoplastic films. Thus, such method and apparatus is not limited to use of two separate films of the same size or shape, but may be used wherever it is required that a weld be formed between overlying areas of two or more of the same or different film materials. Further, although such method and apparatus is expressly suited in continuous operation requiring a production rate of welded film of up to 100 linear feet or more of welded film per minute, such method and apparatus may also be utilized in intermittent or discontinuous film welding operations. Still further, it is pointed out that the apparatus of the present invention may be optionally equipped with various heat and energy regulating and recording means as conventionally used in the art. The electrodes of the present invention may, additionally, be prepared from any suitable material, and may be of any required size providing the limitations in regard to the shape and relationship of the mating surfaces of said electrodes, as described herein, are strictly adhered to.

It is also pointed out that the herein described method and apparatus may be used with any organic thermoplastic film capable of being effectively welded utilizing high frequency techniques. Exemplary of such films are: polyethylene terephthalate and polyvinyl chloride, among others. Such method and apparatus are especially suitably employed, however, when forming packages from normally crystalline vinylidene chloride polymer films, and, more particularly, those crystalline vinylidene polymer films containing between about 70 and 95 percent by weight vinylidene chloride, with the remainder of the polymer molecule being at least one copolymerizable unsaturated monomer. As exemplary of such preferred copolymerizable unsaturated monomers are: alkyl acrylates containing up to about 8 carbon atoms in the alkyl groups, vinyl chloride, acrylonitrile and itaconic acid, although a wide variety of such copolymerizable materials may be advantageously employed.

Further, the polymeric film materials which are sealed by the practice of the instant invention may contain conventional amounts of plasticizers such as dioctyl phthalate, dibutyl sebacate and the like as well as antioxidants, light stabilizers and other additives known in the art.

It is to be understood that the method and apparatus of the present invention are not limited to those polymeric film materials as described herein, but may also be used to weld together thermoplastic surfaces of plastic coated metal foil or paper and the like.

The following example illustrates the present invention but is not to be construed as limiting its scope.

*Example*

In each of a series of experiments, individual double wound films of a plasticized copolymer of about 80 percent by weight of vinylidene chloride and 20 percent by weight vinyl chloride, having a single thickness of about 1 mil, were separately formed into a series of tubular packages utilizing the packaging machine as essentially described in the previously referred to U.S. Patent No. 2,831,302, issued April 22, 1958.

In essence, such machine comprises: a hollow forming mandrel having a radius of ¾ of an inch; mechanism for folding a continuous web or film of organic thermoplastic material around said mandrel with the longitudinal edges thereof in contiguous relationship; an electronic sealing mechanism adjacent said mandrel comprising an elongate sealing electrode mounted on a pivoted arm and having a counterweight adjustably mounted on said arm to hold the sealing electrode in engagement with the overlapped edges of the web and in mating relationship with that portion of the mandrel acting as a grounded, fixed electrode having a film supporting face of generally convex shape and smooth surface; and mechanism below the lower end of the mandrel engaging the formed tube along collapsed portions thereof for advancing the tube in the direction axially of the mandrel.

In each of the experiments, a series of movable, elongate brass sealing electrodes having a mating surface of about 1 to 1¼ inches in length and of varying radius along the said mating surface, were employed utilizing a radiofrequency of 27 megacycles per second and a production rate of about 36 linear feet of welded film per minute. In all cases that portion of the mating surface of the movable electrode, initially adjacent the lapped edges of vinylidene chloride copolymer film, was spaced from said film a distance of about .006 of an inch per linear inch of mating surface, with the remainder of the mating surface of the movable electrode being in essentially uniformly converging relationship with the said film and with the opposite extremities of such mating face contacting the film.

The seal strength of the individually formed tubular materials was then individually obtained for slitting each tube in a position opposite of the weld and in a direction parallel to the weld, and subsequently preparing indicated test samples about 1 inch wide having the welded area intermediate of the sample.

Each so-formed test sample was then placed in a Scott Electronic Tensile Test Machine and the force in pounds per linear inch of seal required to separate the weld obtained.

The following table illustrates the radius of the film contacting surface of the movable, elongate, sealing electrodes used, and the force in pounds per linear inch of seal required to separate the weld in each test sample. It is re-emphasized that in all cases the radius of the mandrel or grounded, fixed cooperating electrode was ¾ of an inch.

TABLE

| Run No. | Radius of Mating Surface of Elongate Movable Sealing Electrode (inches) | Shape of Mating Surface of Elongate Movable Sealing Electrode | Seal Strength, Pounds per linear inch of seal |
|---|---|---|---|
| For Comparison: | | | |
| 1 | ¹⁄₁₆ | Convex | 9.7 |
| 2 | ¹⁄₁₆ | do | 10.1 |
| 3 | ⅝ | do | 11.9 |
| This Invention: | | | |
| 4 | Infinite | Flat | 17.5 |
| 5 | 1³⁄₁₆ | Concave | 17.5 |
| 6 | 1³⁄₁₆ | do | 20.3 |
| 7 | 1⅛ | do | 22.0 |

The above data illustrate the highly desirable, enhanced seal strengths obtained using the method and apparatus of the present invention.

Similarly advantageous results are obtained with other organic thermoplastic films as herein described when treated in the manner described.

What is claimed is:

1. The method for providing a continuous longitudinal seam along lapped surfaces of organic thermoplastic film comprising advancing said lapped surfaces between and in sliding contact with (1) a grounded, fixed electrode having a smooth film supporting surface of generally elongated convex shape the center of curvature of said elongated convex surface lying on a line substantially parallel with said longitudinal seam; and (2) a movable electrode cooperative therewith having a generally elongated concave surface, the radius of curvature of said surface being at least one-sixteenth inch greater than the radius of curvature of said convex surface; and applying to said movable electrode a high frequency source of electrical power operating at an intensity known to weld such film.

2. The method of claim 1, wherein one end of the concave surface of said movable electrode contacts said lapped surfaces of said organic thermoplastic film and the opposite end of said concave surface is spaced apart from said lapped surfaces for a distance of between about 0.001 and 0.006 of an inch per linear inch of said surface.

3. The method of claim 1, wherein said organic thermoplastic film is composed essentially of a normaly crystalline vinylidene chloride polymer film.

4. The method of claim 3, wherein said normally crystalline vinylidene chloride polymer film contains from between about 70 and 95 percent by weight of vinylidene chloride and, complementarily, between about 5 and 30 percent by weight of at least one copolymerizable unsaturated monomer.

5. The method of claim 4, wherein said copolymerizable unsaturated monomer is vinyl chloride.

6. The method of claim 1, wherein said electrical power has a frequency of between about 20 and 200 megacycles per second.

7. An electrode pair for providing a continuous longitudinal seam along lapped surfaces of organic thermoplastic film, having in combination means for advancing lapped films between and in sliding contact therewith comprising; (1) a fixed electrode having an elongated smooth film supporting face of generally convex shape the center of curvature of said convex face lying along a line parallel to said longitudinal seam and (2) a movable elongated electrode cooperative therewith and having a smooth, generally concave face pivotally positioned adjacent said convex face to permit the passage of said lapped surface therebetween, the radius of curvature of said concave face being at least about $1/16$ of an inch greater than that of the film supporting face of said fixed electrode, and means to conduct radio frequency power to one of the electrodes while the other is grounded.

8. The electrode pair of claim 7, wherein one end of said movable electrode is spaced apart from said lapped surfaces for a distance of between about 0.001 and 0.006 of an inch per linear inch of said movable electrode and wherein the opposite extremity of said movable electrode is in contact with said lapped surfaces.

9. The electrode pair of claim 7, wherein said movable electrode is electrically connected to a high frequency source operating between about 20 and 200 megacycles per second.

10. The electrode pair of claim 7, wherein said fixed electrode is a hollow tubular mandrel the outer surfaces of which support a continuous web of thermoplastic film having the longitudinal edges thereof in contiguous relationship.

References Cited by the Examiner
UNITED STATES PATENTS

| | | | |
|---|---|---|---|
| 2,484,076 | 10/1949 | Collins | 156—380 |
| 2,718,915 | 9/1955 | Piazze | 156—380 |
| 3,142,601 | 7/1964 | Polk et al. | 156—380 X |

EARL M. BERGERT, *Primary Examiner.*

DOUGLAS J. DRUMMOND, *Examiner.*